Patented May 16, 1944

2,348,855

UNITED STATES PATENT OFFICE 2,348,855

MANUFACTURE OF SOAP

Ashton T. Scott, Ardmore, Pa., assignor to The Sharples Corporation, Philadelphia, Pa., a corporation of Delaware Original application May 6, 1940, Serial No. 333,547. Divided and this application November 4, 1941, Serial No. 417,747

6 Claims. (Cl. 260—418)

This application is a division of my prior application, Serial No. 333,547, filed May 6, 1940, for Manufacture of soap. My prior application pertains to a continuous process for manufacture of soap by continuously mixing a saponifying reagent with a source of fat to effect saponification thereof, and separating soap formed by the saponification reaction from spent saponifying reagent by centrifugation. The present application pertains to the special procedure described on page 12 of my prior application by which the mixture under treatment in that application is subjected to artificial extraction of heat during passage to the centrifugal separator.

A feature of the present invention consists in the fact that it provides a procedure by which the continuous saponification reaction may be more quickly accomplished and more fully controlled than can the embodiments of my prior application in which the features of the present invention are omitted. The manner in which these results are attained will be more evident from consideration of the following detailed description of the invention, and the attached drawing, in which, Figure 1 represents a flow sheet of one preferred method of practicing the invention, and Figure 2 represents an alternative embodiment of the invention.

Figure 1:
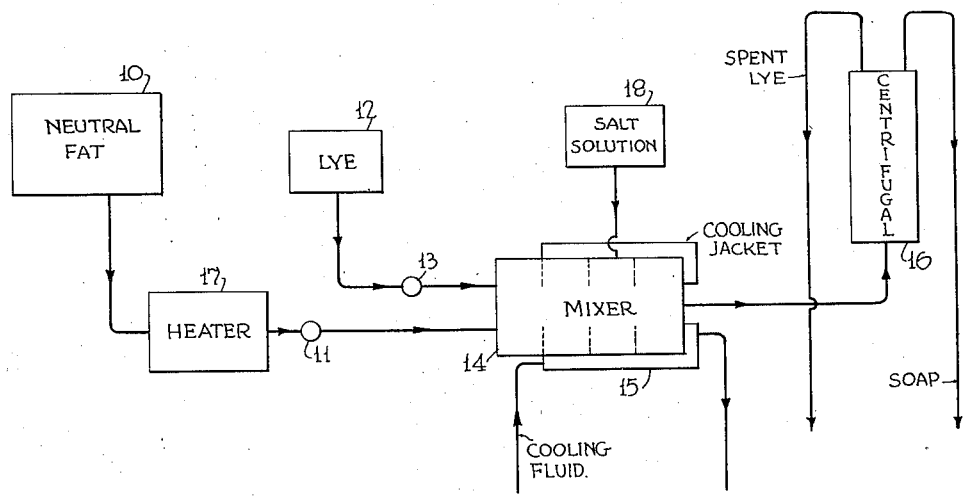
Figure 2:
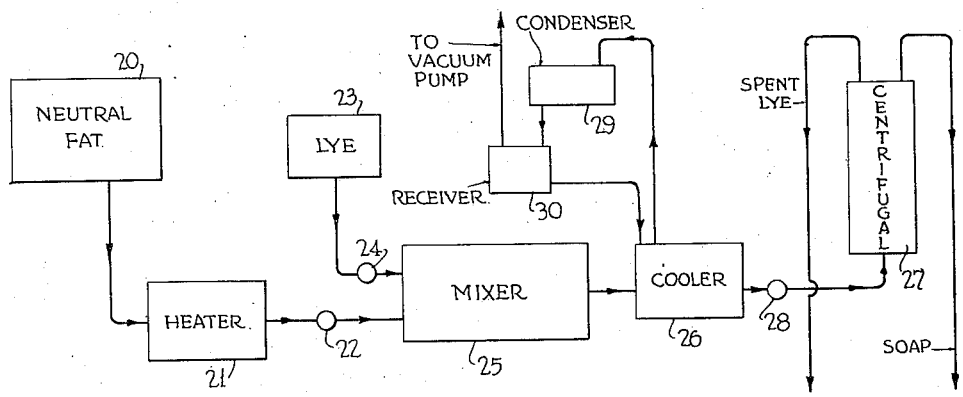

In the practice of the invention in accordance with Figure 1 of the drawing, a saponifiable mass, such as neutral fat from container 10 is passed by pump 11 to a mixer 14, where it is mixed with a saponifying reagent passed from container 12 by pump 13 into confluence with the source of fat in this mixer.

The mixer 14 may be any suitable type of mixer adapted to effect violent mixing of the saponifying reagent with the source of fat, but a multi-stage high speed mechanical mixer is preferred for performance of the mixing function. The mixing of the saponifying reagent with the fat at a saponifying temperature results in formation of soap, and the soap-containing mass is mixed with a salting out agent, such as a salt solution from container 18, in order to condition the soap for subsequent centrifugal separation from aqueous phase. While the salt solution is indicated on the flow sheet as being added at the third stage of the mixer, it may be added at any suitable point, and there are certain very definite advantages in adding it at an earlier stage, either separately, or as a part of the solution of saponifying reagent, as taught in my co-pending application Serial No. 334,297, filed May 10, 1940, for Manufacture of soap.

The violent agitation of the soap-containing mass is preferably continued during the progress of this material practically up to the instant when this material enters the centrifugal separator 16. By continuing the agitation in this manner, the mass is maintained in a substantially homogeneous condition, with the result that continuous and fairly uniform feed to the centrifugal separator 16 becomes feasible.

The centrifugal separator 16 may be of any well known type adapted to effect continuous separation of aqueous phase from the soap, and continuous discharge of these separated phases, as illustrated. This centrifugal is preferably operated under atmospheric or super-atmospheric pressure. If a liquid balance type centrifugal provided with conventional weirs and separate receiving covers is employed, it will be desirable to inject a hot liquid into the soap-receiving cover of the centrifugal in order to assist in continuous removal of soap from the centrifugal, as taught in my prior application.

In the above discussion, I have restricted myself to consideration of features of the invention which are common to this invention and copending application Serial No. 333,547. While the manufacture of soap may be accomplished continuously in a satisfactory manner by the practice of these features, the process as described above has certain definite limitations as so practiced, unless the features of the present invention are also employed. Thus, in order to make most effective use of the apparatus in a process of this character, it is desirable that the saponification reaction be accomplished very promptly. But rapid saponification requires that the material to be saponified be heated to a temperature fairly close to or above the boiling point of the aqueous phase, either prior to the start of the saponification reaction, or at an early stage of that reaction. The heat of saponification is quite considerable, particularly in saponification of neutral fat with lye, as illustrated on the flow sheet, and as practiced in the first or so-called "killing" stage of the soap making procedure. As a consequence of this fact, if the fat is heated to a temperature very close to the boiling point of the aqueous phase before the beginning of the saponification reaction, the mixture will attain a temperature substantially above that boiling point by the time it reaches the centrifugal 16, with the result that the process of centrifugation cannot be efficiently accomplished except by the provision of special, and relatively expensive apparatus for maintaining the centrifugal rotor and surrounding space under super-atmospheric pressure. Regardless of the pressure under which the centrifugal operates, efficient centrifugation cannot be accomplished if the temperature of the mixture introduced into the centrifugal is above the boiling point of the aqueous phase at that pressure. This difficulty is overcome, in the practice of the invention, by heating the saponifiable fat to a temperature sufficiently high to effect very rapid saponification by contact with the saponifying reagent, and extracting heat artificially from the resulting mixture during the course of the saponification reaction or during the passage of the saponified mass to the centrifugal, in order that efficient centrifugation may be economically accomplished, and a higher temperature used in the saponification reaction than would otherwise be consistent with efficient centrifugation in the particular centrifugal employed.

Referring again to the drawing, the source of fat may be heated by passage through a continuous heater 17, or by preheating in the container 10, and this fat may be mixed with lye in the mixer 14 at a temperature which causes the saponification reaction to proceed rapidly from the very outset. As heat is developed by the saponification reaction, the mixture is maintained at, or restored to, a temperature suitable for centrifugation by artificial extraction of heat from the material in the mixer. This may be accomplished, for example, as illustrated, by providing a jacket 15 surrounding the more advanced stages of the mixer 14, and by circulating a cooling fluid through this jacket. Alternatively, it may be accomplished by providing cooling coils in the main body of the mixer, by adding a refrigerant to the material under treatment, by cooling the salt solution added to the mixture from the container 18, or by the method described hereinafter in connection with Figure 2 of the drawing. In any case, in the practice of the invention, sufficient heat is extracted artificially from the material under treatment to maintain the feed to the centrifugal at a temperature suitable for efficient centrifugation.

Persons skilled in the art will be aware of various other possible modifications of the invention. Thus, the saponifying reagent as well as the fat may be pre-heated before passage to the mixer, and the invention may also be practiced by heating the mixed stream of saponifying reagent and fat instead of heating these materials separately.

It will be seen that, by the practice of the invention, the saponification reaction may be greatly speeded up, since it is possible to heat the fat to be saponified to a temperature in the neighborhood of the boiling point of water, or even in excess of that point, and thereafter cool the saponified mass to a temperature at which it may be efficiently subjected to centrifugal separation. Since the mixer 14 is preferably a closed mixer, loss by evaporation will not occur at this stage of the process, regardless of the temperature, and it is only necessary to provide sufficient artificial cooling during the later stages of saponification, or subsequent to saponification, to deliver the saponified mass to the centrifugal separator 16 at the desired temperature.

An alternative method of practicing the invention is illustrated in Figure 2 of the drawing.

In accordance with this embodiment, the fat to be saponified is passed from container 20 through heater 21 by pump 22 into mixer 25, this fat being mixed with the saponifying reagent from container 23 after passage of that reagent to the mixer 25 by pump 24. The features of this embodiment of the invention by which the saponified mass is formed are similar to those described above in connection with Figure 1 of the drawing.

After the saponification reaction has been substantially completed, the mixture is passed to a zone of lower pressure. This pressure may be controlled at a desired sub-atmospheric, atmospheric or super-atmospheric pressure. The mixture is thus artificially cooled by evaporation of water from the mixture at said zone of lower pressure. The mixture may, for example, be passed to a flash cooling chamber 26, where it is subjected to sub-atmospheric pressure to evaporate water, which is condensed in condenser 29 and collected in receiver 30 from which it may be returned to cooler 26 if desired. This evaporation of water from the mixture causes it to be artificially cooled, and the cooled mass is then pumped by pump 28 to centrifugal 27, which effects separation of spent lye from the saponified mass in a manner similar to that of the operation of centrifugal 16.

*Example*

A fat mixture containing 45% tallow, 35% coconut oil, and 20% palm oil was charged at a uniform rate of 900 pounds per hour to a closed four compartment mixer provided with a coil for the circulation of cooling water in indirect heat exchange relationship with the fat in the last (in the direction of fat flow) of the four mixing compartments. Simultaneously, a saponifying reagent stream of 11% NaOH and 10% NaCl concentration was introduced to the first compartment of the mixer at a rate of 1150 pounds per hour with the fat stream at 220° F. and the reagent stream at 166° F., and with no cooling water being flowed through the coil. The temperature at the mixer inlet was 183° F. and at the outlet 220° F. Current consumption by the mixer motor was 21 amperes. The reaction mixture was continuously conducted to a centrifugal of the liquid balance type and there separated into two streams of partially saponified soap and spent lye respectively. During a run of one hour under these conditions, a total of 620 pounds of spent lye of .39% NaOH concentration was discharged from the centrifugal. The unreacted NaOH in this spent lye represented 1.9% of the NaOH in the reagent charge, and the utilization of NaOH in the desired saponification was therefore 98.1% complete.

Following this test, the temperature of the reagent charge was raised from 166° F. to 196° F. in response to which the temperature at the mixer inlet rose to 204° F. and at the outlet to 237° F. At the latter temperature, steam flashed in excessive amounts from the feed jet to the centrifugal, causing turbulence within the bowl and preventing efficient separation. A stream of cooling water was then flowed through the cooling coil in sufficient amount to reduce the mixer outlet temperature to 220° F. at which temperature the reaction mixture could be fed to the centrifugal without flashing. The temperature at the mixer inlet was unaffected, remaining at 204° F. Current consumption by the mixer motor was 17 amperes.

During a one hour run under these conditions a total of 614 pounds of spent lye of .13% NaOH concentration was discharged from the centrifugal. The unreacted NaOH in this spent lye represented only .63% of the NaOH in the reagent charge, and the utilization of NaOH in the desired saponification was 99.37% complete. This example showed that the higher reaction temperature in the fore part of the mixer made practicable by cooling resulted in a more nearly complete utilization of the saponifying reagent and a reduction of nearly 20% in electric power consumed in the mixing step.

Various further modifications are possible within the scope of the invention, and I do not wish to be limited except by the following claims.

I claim:

1. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the step comprising artificially extracting heat from the mixture after the beginning of the saponification reaction during the passage of the mixture to the zone of centrifugation.

2. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the step comprising artificially extracting heat from the mixture by indirect heat exchange after the beginning of the saponification reaction during the passage of the mixture to the zone of centrifugation.

3. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the steps comprising continuously heating the fat prior to confluence thereof with the saponifying reagent and thereafter artificially extracting heat from the mixture resulting from addition of the saponifying reagent to the fat after the beginning of the saponification reaction during the passage of the mixture to the zone of centrifugation.

4. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the step comprising artifically extracting heat from the mixture by passing said mixture to a zone of lower pressure than that at which initial saponification is effected, whereby to remove aqueous phase and thereby cool the mixture resulting from the saponification reaction after the beginning of the saponification reaction during passage of the mixture to the zone of centrifugation.

5. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the steps comprising effecting initial saponification of the fat by passing the mixture of fat and saponifying reagent through mixing apparatus under super-atmospheric pressure and at a temperature capable of causing saponification of said fat, thereafter artificially extracting heat from the saponified mixture by passing said mixture to a zone of lower pressure than that prevailing in the initial saponification step and removing aqueous phase from said mixture at said zone of lower pressure, and passing the mixture cooled by evaporation of aqueous phase to the zone of centrifugation.

6. In the manufacture of soap by a continuous process comprising subjecting a mixture of a saponifiable fat and a saponifying reagent to a saponifying temperature, salting out the resulting soap and separating soap of the resulting mixture from aqueous saponifying reagent by centrifugation, the steps comprising passing said fat and saponifying reagent at a saponifying temperature through a mixer maintained under super-atmospheric pressure under temperature and reaction conditions by which a temperature in excess of the boiling point of aqueous phase at atmospheric pressure is obtained in said mixer, thereafter cooling the saponified mass by artificial extraction of heat to a temperature below the boiling point of the aqueous phase at the zone of centrifugation, and passing the cooled mixture to the zone of centrifugation at said reduced temperature.

ASHTON T. SCOTT.